(12) United States Patent
Bau, III et al.

(10) Patent No.: US 7,356,803 B2
(45) Date of Patent: Apr. 8, 2008

(54) ANNOTATION BASED DEVELOPMENT PLATFORM FOR ASYNCHRONOUS WEB SERVICES

(75) Inventors: David Bau, III, Gladwyne, PA (US); Adam Bosworth, Mercer Island, WA (US); Gary S. Burd, Kirkland, WA (US); Roderick A. Chavez, Kirkland, WA (US); Kyle W. Marvin, Issaquah, WA (US)

(73) Assignee: BEA Systems, Inc., San Jose, CA (US)

( * ) Notice: Subject to any disclaimer, the term of this patent is extended or adjusted under 35 U.S.C. 154(b) by 473 days.

(21) Appl. No.: 10/082,807

(22) Filed: Feb. 22, 2002

(65) Prior Publication Data

US 2003/0005181 A1    Jan. 2, 2003

Related U.S. Application Data

(60) Provisional application No. 60/302,981, filed on Jul. 2, 2001.

(51) Int. Cl.
*G06F 9/44* (2006.01)
(52) U.S. Cl. .......... 717/116; 717/136; 717/137; 717/143
(58) Field of Classification Search ........ 717/116–117, 717/140, 136, 137, 143; 719/311, 315, 330
See application file for complete search history.

(56) References Cited

U.S. PATENT DOCUMENTS

| | | | |
|---|---|---|---|
| 5,812,768 A | 9/1998 | Pagé et al. | |
| 5,970,490 A | 10/1999 | Morgenstern | |
| 6,070,184 A | 5/2000 | Blount et al. | |
| 6,151,638 A * | 11/2000 | Hale et al. | ................... 719/312 |
| 6,209,018 B1 * | 3/2001 | Ben-Shachar et al. | ...... 718/105 |
| 6,226,675 B1 | 5/2001 | Meltzer et al. | |
| 6,230,160 B1 | 5/2001 | Chan et al. | |
| 6,253,252 B1 | 6/2001 | Schofield | |
| 6,314,429 B1 | 11/2001 | Simser | |
| 6,404,445 B1 | 6/2002 | Galea et al. | |
| 6,449,620 B1 | 9/2002 | Draper et al. | |
| 2001/0029604 A1 | 10/2001 | Dreyband et al. | |
| 2001/0047385 A1 | 11/2001 | Tuatini | |
| 2002/0073236 A1 | 6/2002 | Helgeson et al. | |
| 2002/0099738 A1 | 7/2002 | Grant | |
| 2002/0184264 A1 | 12/2002 | Berg et al. | |

OTHER PUBLICATIONS

Aralanthu, Applying C++, Patterns, and Components to Develop and IDL Compiler for CORBA AMI Callbacks, Mar. 2000, pp. 1-13.*

(Continued)

*Primary Examiner*—William Thomson
*Assistant Examiner*—Phuong N Hoang
(74) *Attorney, Agent, or Firm*—Schwabe, Williamson & Wyatt, P.C.

(57) ABSTRACT

An annotation based development platform for asynchronous web services is described. In one embodiment, the developer expresses logic offered by the web service using a standard programming language augmented with declarative annotations specifying preferences for exposing that logic as an asynchronous web service. At compile time, an enhanced compiler analyzes the annotated source file and automatically generates the mechanisms required to expose its functionality as an asynchronous web service.

16 Claims, 10 Drawing Sheets

OTHER PUBLICATIONS

Banbara et al., "Translating a Linear Logic Programming Language into Java," Electronic Notes in Theoretical Computer Science, 1999, pp. 1-15.

Binding et al., "Generation of Java Beans to Access XML Data," Proceedings of the first International Conference on Web Information Systems Engineering, Jun. 2000, vol. 2, pp. 143-149.

Chandramouli, R., "Application of XML Tools for Enterprise-Wide RBAC Implementation Tasks," Proceedings of the 5th ACM Workshop on Role-based Access Control, Jul. 2000, pp. 11-18.

Ha et al., "Mapping XML Documents to the Object-Relational Form," IEEE, Jun. 12, 2001, pp. 1757-1761.

Imamura et al., "Mapping between ASN.1 and XML," Jan. 2001, Proceedings of the 2001 Symposium on Application and the Internet, pp. 57-64.

Rundensteiner et al., "Maintaining Data Warehouses over Changing Information Sources," Communications of the ACM, Jun. 2000, vol. 43, No. 6, pp. 57-62.

Sahuguet et al., "Looking at the Web through XML glasses," Proceedings of the 1999 IFCIS International Conference on Cooperative Information Systems, Sep. 1999, pp. 148-159.

Suzuki et al., "Managing the Software Design documents with XML," ACM, 1998, pp. 127-136.

Wallace et al., "Haskell and XML: Generic Combinations or Type-Based Translation?" ACM, 1999, pp. 148-159.

Zwol et al., "The Webspace Method: On the Integration of Database Technology with Multimedia Retrieval," Proceedings of the 9th International Conference on Information and Knowledge Management, Nov. 2000 pp. 438-445.

Yemini, S. A. et al., "Concert: a high-level-language approach to heterogeneous distributed systems", International Conference on Distributed.

* cited by examiner

```
ItemList items;           // each basket will have its own item list

/* @Operation
 * @Conversation Start */     // creates a new item list
void newBasket() { ... }

/* @Operation
 * @Conversation Continue */  // continues an existing conversation
void addItem(Item i) { ... }  // using the associated item list /* @Operation
 * @Conversation Finish */    // finishes an existing conversation
void checkout(Payment p) { ... }  // and deletes the associated item list /* @Operation
 * @Conversation Finish
 * @buffer */                 // finishes an existing conversation
void cancel() { ... }         // and deletes the associated item list /* @Operation */              // stateless method
int activeBaskets() { ... }   // returns number of baskets in use
```

```
/**
 * @operation
 */
public String greeting(String firstname, String lastname)
{
    Calendar cal =
        Calendar.getInstance(TimeZone.getDefault());
    SimpleDateFormat sdf =
        new java.text.SimpleDateFormat("yyyy-MM-dd HH:mm:ss");

return "Hello " + firstname + " " + lastname +
        " at " + sdf.format(cal.getTime());
}
```

FIG. 3A

```
POST /app/mypackage/CreditReport.jws HTTP/1.1
Host: www.company.com
Content-Type: text/xml; charset="utf-8"
Content-Length: 648
SOAPAction: "Some-URI"

<soap:Envelope
  xmlns:soap="http://schemas.xmlsoap.org/soap/envelope/"
  xmlns:cgc="http://bea.com/SOAP/conversation"
  soap:encodingStyle="http://schemas.xmlsoap.org/soap/encoding/"/>
  <soap:Header>
  </soap:Header>
  <soap:Body>
    <m:greeting xmlns:m="http://www.company.com/app/mypackage/CreditReport.jws">
      <firstname>Jane</firstname>
      <lastname>Doe</lastname>
    </m:greeting>
  </soap:Body>
</soap:Envelope>
```

FIG. 3B

```
HTTP/1.1 200 OK
Content-Type: text/xml; charset="utf-8"
Content-Length: 574

<soap:Envelope
   xmlns:soap="http://schemas.xmlsoap.org/soap/envelope/"
   soap:encodingStyle="http://schemas.xmlsoap.org/soap/encoding/"/>
   <soap:Header>
   </soap:Header>
   <soap:Body>
      <m:greetingResponse
         xmlns:m="http://www.company.com/app/mypackage/CreditReport.jws">
         <result>Hello Jane Doe at 2001-08-15 16:18:04</result>
      </m:greetingResponse>
   </soap:Body>
</soap:Envelope>
```

FIG. 3C

```
<s:Envelope xmlns:s="http://schemas.xmlsoap.org/soap/envelope/"
            xmlns:c="http://openuri.org/soap/conversation/">
   <s:Header>
      <c:conversationID>4232-133214-3223132:42332-3144-2332251</c:conversationID>
      <c:defaultCallbackURL>
         http://original.com/foo/Callbacks.jwi
      </c:defaultCallbackURL>
   </s:Header>
   <s:Body>
      <!-- contents omitted -->
   </s:Body>
</s:Envelope>
```

FIG. 4

ANNOTATION BASED DEVELOPMENT PLATFORM FOR ASYNCHRONOUS WEB SERVICES

RELATED APPLICATIONS

This patent application claims priority to Provisional Patent Application No. 60/302,981 filed on Jul. 02, 2001, which is hereby fully incorporated by reference.

BACKGROUND OF THE INVENTION

1. Field of the Invention

The present invention generally relates to the field of Web services. More specifically, the present invention relates to integrated development and deployment of asynchronous Web services.

2. Background Information

There is a rapidly expanding industry emerging around web services, a term loosely defined as the ability to share software as a service using network protocols. Industry leaders are busy developing an infrastructure to enable web services, including mechanisms for finding web services, understanding what they offer and interacting with them via extensible Markup Language (XML) messages. This web services infrastructure aims to enable a new breed of distributed software application composed of software and information services shared across the Internet.

As the web service infrastructure evolves, it is becoming increasingly complicated, requiring more time, skill, knowledge and ultimately money to create web services. Consequently, the generation and deployment of web services is increasingly tedious and unnecessarily complicated for the average developer. Currently, in addition to developing the software logic offered via the web service, developers are also required to address a number of tedious and complex issues involving web service generation and deployment.

For example, in order to generate and deploy the most basic of web services, developers are currently required to implement one or more mechanisms for: Sending and receiving data via internet protocols; parsing and generating message bodies and headers packaged using protocols such as the Simple Object Access Protocol (SOAP); controlling access to services in a secure way; mapping data between XML messages and internal data structures within the web service logic; transacting operations so they are reliable and predictable; decoupling temporal dependencies so distributed applications can proceed reliably when external services are down or unavailable; decoupling implementation dependencies so distributed applications can proceed predictably when external services change their underlying implementations; developing service descriptions e.g. using the Web Services Description Language (WSDL) and using external web services described by e.g. WSDL; developing proxy objects that make it easy for client software written in a variety of languages to interact with the service and for the service to interact with other external services; and so forth.

Thus, it can be readily seen that in addition to developing the web service logic, current day developers are also required to spend time and effort on implementation and deployment aspects unrelated to the web service logic. This is particularly true for non-trivial web services, which manage many simultaneous stateful and asynchronous conversations in a secure, reliable, scalable and rapidly evolvable way. Such stateful and asynchronous web services further require mechanisms for tracking and correlating the requests associated with each stateful conversation (identified as a series of related service requests), for managing the data associated with many simultaneous, long running conversations, and for coordinating asynchronous conversations that do not return immediate results, just to name a few.

BRIEF DESCRIPTION OF DRAWINGS

The present invention will be described by way of exemplary embodiments, but not limitations, illustrated in the accompanying drawings in which like references denote similar elements, and in which:

FIG. 2 illustrates example source code augmented with meta-data annotations in accordance with one embodiment of the invention;

FIGS. 3A-C illustrate one implementation of a web service method and associated wire protocol in accordance with one embodiment of the invention;

FIG. 4 illustrates a conversation ID header and a Callback location header within a SOAP message;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention provides a flexible and extensible platform that simplifies the task of developing stateful and asynchronous web services by allowing web service developers to focus on developing the logic of the web service rather than implementation and deployment particulars. In one embodiment of the present invention, the developer expresses the logic offered by the web service using a standard programming language augmented with declarative annotations specifying preferences for exposing that logic as a web service. At compile time, an enhanced compiler analyzes the annotated source file and automatically generates the mechanisms required to expose its functionality as a web service. Because the annotations are declarative, they may be easily visualized, created and modified using a graphical user interface, further simplifying the developer's task. Thus, the present invention decreases the time, knowledge, skill and ultimately cost required to develop stateful and asynchronous web services.

Figure 1:
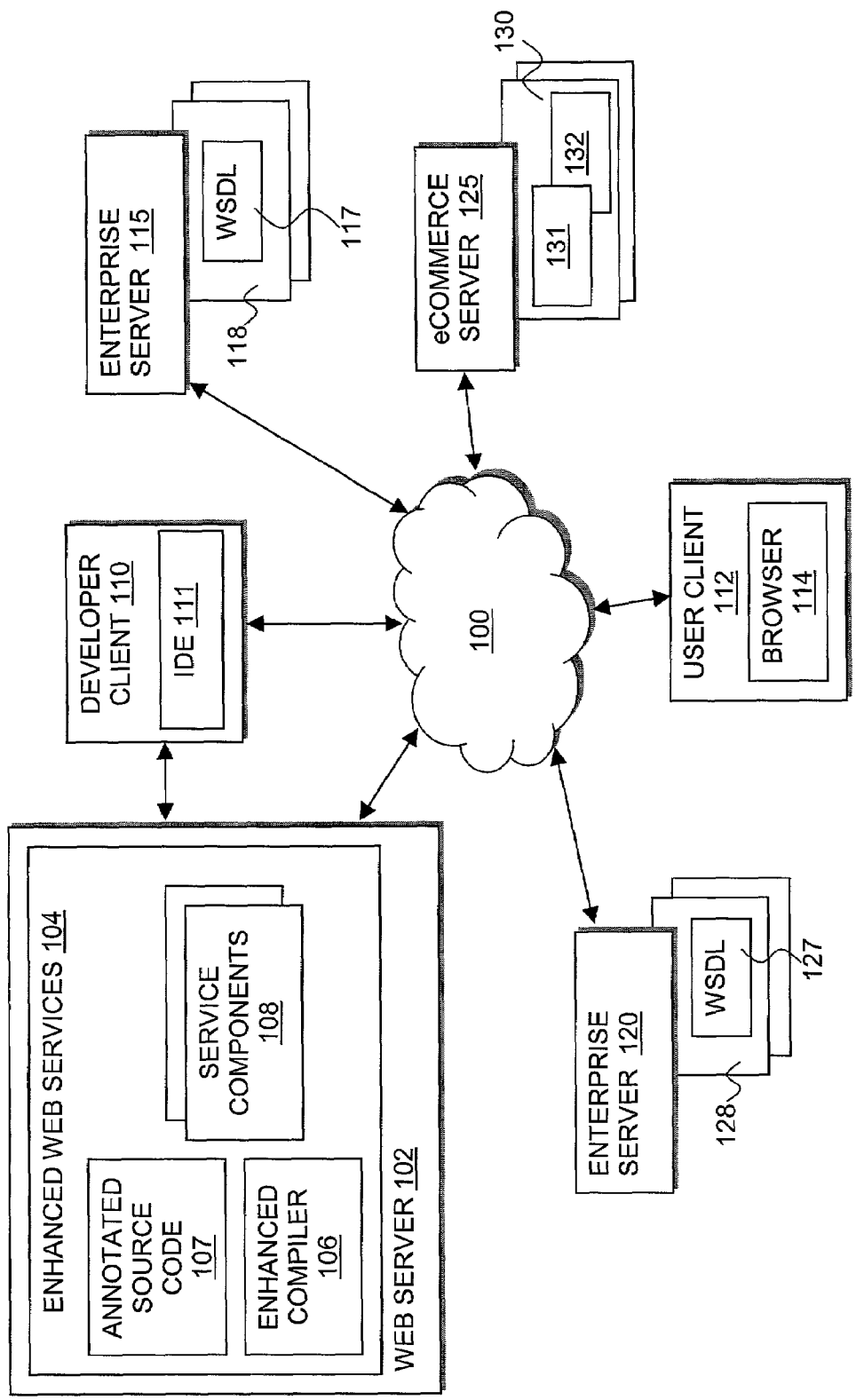
FIG. 1 illustrates an overview of one embodiment of the present invention within the context of an example network of web service providers and consumers.

FIG. 1 illustrates an overview of one embodiment of the present invention within the context of an example network of web service providers and consumers. In FIG. 1, web server 102, developer client 110, enterprise servers 115 and 120, user client 112 and eCommerce web server 125 are communicatively coupled together through networking fabric 100 as illustrated. Networking fabric 100 represents one or more interconnected data networks, such as the Internet or World Wide Web, that are equipped to employ one or more well-known communication protocols such as the hypertext transfer protocol (HTTP).

Web server 102 represents one or more computing devices equipped with enhanced web services 104 of the present invention to provide conversational and asynchronous web services to remote clients, such as user client 112 as well as enterprise servers 115 and 130, which are communicatively coupled to networking fabric 100. Enhanced web services 104 includes annotated source code 107, enhanced compiler 106, and various deployed service components 108. As will be discussed in further detail below, when annotated source code 102 is compiled by enhanced compiler 106, the compiler generates one or more object files, software components and deployment descriptors to facilitate the automated deployment of web service components 108. In the illustrated embodiment, developer client 110 represents a computing device equipped with integrated development environment (IDE) 111 to facilitate graphical interface-based design and development of enhanced web services 104 by a developer. In place of, or in addition to being communicatively coupled to web server 102 through networking fabric 100, developer client 110 can be coupled directly (e.g. via a local area network) to web server 102 as shown. Furthermore, rather than being installed on an external client device such as developer client 110, IDE 111 may instead be collected with enhanced web services 104 on web server 102 without departing from the spirit and scope of the invention.

Enterprise servers 115 and 120 represent publicly accessible servers belonging to one or more organizations that have published web service components 118 and 128 with associated web service description files 117 and 127, respectively. In the illustrated embodiment, web service description files 117 and 127 represent XML-based web service description language (WSDL) files that advertise the capabilities of web service components 118 and 128 to devices coupled to networking fabric 100 including user client 112 and web server 102.

User client 112 represents a general-purpose computer system such as, but not limited to a desktop computer, laptop computer, palmtop computer, network appliance, a personal digital assistant (PDA), and so forth, equipped with web browser 114. In the illustrated embodiment, user client 112 accesses (e.g. via networking fabric 100) web page(s) 130 hosted by eCommerce server 125. Web pages 130 may include content 131, such as merchandise descriptions, reviews and pricing information, as well as one or more web functions 132. When executed, web functions 132 may send requests to web server 102 causing one or more service components 108 to be executed, which in turn may send one or more requests to enterprise servers 115 and 120 causing one or more remote components 118 and/or 128 to further be executed.

For example, assume web page(s) 130 displays merchandise that is offered for sale by a given online merchant via eCommerce web server 125. Web function(s) 132 may request various functions of a shopping cart service provided by web server 102 including an "add an item to cart" function, a "remove an item from cart" function, and a "checkout" function. By selecting a button graphically displayed on web page(s) 130 for example, a user may cause one or more requests for shopping cart functions to be generated. This in turn may cause one or more of service components 108 to be remotely executed on web server 102 via e.g. the well-known Simple Object Access Protocol (SOAP). In the illustrated example, the initiation of a checkout function by user client 112 may cause web server 102 to communicate with enterprise servers 115 and/or 120 to obtain one or more credit authorizations for use by the online merchant in completing the user's purchase transaction. In one embodiment, web server 102 communicates with enterprise server 115 and/or 120 based upon their public interfaces advertised by WSDL files 117 and/or 127. Once enterprise servers 115 and/or 120 provide web server 102 with the solicited credit information, server components 108 can perform a variety of actions depending upon the particular web logic deployed.

In the above example, enhanced web services 104 processed a single shopping cart transaction pertaining to a single user client. More often, however, web services are required to process numerous simultaneous transactions while maintaining state associated with each transaction. In the shopping cart web service for example, each user client will use a separate shopping basket, each containing a separate list of items. Each user client will request a new shopping cart, add items to the shopping cart, remove items from the shopping cart, and finally check out or cancel the operation. Thus, the web service needs to keep track of all the shopping lists and ensure that each incoming client request (e.g. new, add, remove & check-out) is applied to the correct list. Furthermore, each credit authorization request needs to be correlated with the correct user so as to avoid mistaken authorizations. Therefore, it should be apparent that as the number of users and associated transactions increase, the need to efficiently manage conversations (i.e.

correlate multiple requests and responses) and the associated state becomes increasingly important. Accordingly, the present invention automatically generates code to manage state associated with multiple, simultaneous conversations. Similarly, because external web services (i.e. such as those offered by enterprise servers 115 and 120) are not always designed to respond to the initiating web service immediately, the present invention further provides the automatic generation of code for managing one or more asynchronous transactions where for example, responses may be temporally separated from the initiating request and arrive on a separate connection.

In one embodiment, enhanced compiler 106 compiles programming language source code that has been augmented with declarative annotations specifying preferences for exposing programming logic as a web service. At compile time, enhanced compiler 106 analyzes the annotated source file and automatically generates the mechanisms necessary to expose its functionality as a stateful and/or asynchronous web service based at least in part upon the annotations.

At run time, enhanced web services 104 of the present invention receives messages from remote clients requesting that one or more web service methods be invoked. Enhanced web services 104 parses each message to identify the method being called and dispatches the request to one or more of service components 108 depending upon whether the requested method comprises a stateless or stateful request for example.

Web Service Design

In one embodiment of the present invention, IDE 111 facilitates graphical interface-based web service design and development. Using IDE 111 for example, a developer is able to graphically associate remote clients, external services, web methods, and so forth, with the web service logic being designed. Additionally, using IDE 111 a developer is able to identify which methods (if any) should be buffered, which methods should be asynchronous, which methods should be stateful, and which methods are to cause a non-isomorphic mapping between incoming message elements and native language objects for example. Furthermore, once a method has been added to the web service (e.g. via graphical manipulation by the developer), IDE 111 provides the developer with the ability to further define and/or modify the method by specifying one or more parameters and/or attributes. For example, if a developer drags a method indicator to graphically connect the current web service to the client, a dialog may be displayed to enable the developer to declare a method name, member variable names, variable types, expected return types and so forth. Similarly, if a developer graphically associates an external service with the web service under development, the developer may be provided the opportunity to import a description file for the web service, such as WSDL file 117 or 127.

In one embodiment of the invention, IDE 111 automatically annotates the web service source code with declarative meta-data based upon graphical and/or textual input provided by the developer through one or more interfaces of IDE 111. In one embodiment, enhanced compiler 106 utilizes the meta-data annotations during compilation of the source code to facilitate generation of stateful and asynchronous web services. For example, if a developer graphically identifies a method as being buffered (e.g. by dragging an icon representing a buffer onto or near the associated graphical representation of a method), IDE 111 annotates the associated method within the source code with meta-data to indicate to enhanced compiler 106 that the method is to be buffered. During compilation, enhanced compiler 106 recognizes the method as being buffered based at least in part upon the meta-data annotations, builds one or more class files (and potentially additional support files) and deploys them to server 102 to buffer incoming requests for that method accordingly.

In one embodiment of the invention, a developer using IDE 111 is able to toggle between various screen views including a graphical design view, and a source view. In accordance with one embodiment of the invention, using the source view a developer can manually enter meta-data annotations directly within the source code to identify those portions of the source code that are to be exposed as web services.

As the developer interacts with IDE 111 to specify a web service, IDE 111 contemporaneously creates directories on web server 102, into which various files, including the web service source code file and imported web service description files, are stored. In one embodiment, IDE 111 attaches a "*.jws" extension to the web service source code filename, which is then stored in a publicly accessible project directory on web server 102. In one embodiment, web server 102 is configured to redirect client requests for this file to a servlet for processing instead of returning the contents of the file to the client. IDE 111 may communicate with web server 102 to create such files and directories via networking fabric 100 using one or more network protocols such as the file transfer protocol (FTP).

Meta-Data Annotations

As was previously mentioned, in one embodiment of the invention source code files are augmented by adding (whether automatically by IDE 111 or manually by the developer) meta-data annotations to the source code files to describe which portions of the source files are to be exposed as web services and to control implementation details, such as wire protocol preferences. In one embodiment, meta-data annotations are placed within a comment field immediately preceding the statement or declaration the annotation will operate on. In one embodiment of the invention, meta-data annotations include one or more symbols and/or keywords defined by an extended syntax known to the compiler. In the illustrated embodiment, a keyword preceded by a '@' symbol indicates to enhanced compiler 106, which is equipped to recognize such a symbol/keyword combination or derivation thereof based upon the extended syntax, that the associated source code is to be exposed as part of the web service.

In one embodiment of the invention, compiler 106 has been enhanced to recognize numerous such meta-data annotations. In one embodiment, enhanced compiler 106 recognizes meta-data annotations that indicate whether an associated method is stateful, and if so, whether the method applies to the start of a conversation (i.e. a "start" method) between a specific client and web server 102, a continuation of a conversation (i.e. a "continue" method), or the completion of a conversation (i.e. a "finish" method). In one embodiment, stateful annotations cause enhanced compiler 106 to generate one or more persistent components to maintain conversational state relating to the associated method. In one embodiment, enhanced compiler 106 automatically generates one or more Enterprise JavaBeans™ (such as an entity bean) as well as associated deployment descriptors to store and manage such conversational state. In one embodiment, each time a start method is invoked at run-time, a new instance of a conversation is created, and a unique identifier is associated with that conversational instance by a persistent component to facilitate management of multiple simultaneous conversations. In one embodiment, a client requesting a conversational start method generates a unique identifier that is used for each subsequent transaction between that client and the web service until a finish method is called. In one embodiment, the identifier is passed between the client and web service by way of a SOAP based message header.

In addition to conversational annotations, in one embodiment enhanced compiler 106 also recognizes meta-data annotations indicating whether an associated method should be buffered to reliably handle a large number of simultaneous requests at peak usage times. In one embodiment, compilation of source code containing buffered annotations causes enhanced compiler 106 to instantiate one or more queues to temporarily store one or more associated requests such that they may be processed in order of arrival when server 102 has resources free to process them. In one embodiment, enhanced compiler 106 utilizes one or more Enterprise JavaBeans™ (such as a message driven bean) to dispatch queued requests.

FIG. 2 illustrates example source code augmented with meta-data annotations in accordance with one embodiment of the invention. As shown, the example source code of FIG. 2 represents five methods (206-210) preceded by associated metadata annotations (201-205) respectively. Methods 206-209 represent conversational methods as identified by the presence of the @CONVERSATION annotation in 201-204 respectively, whereas method 210 represents a stateless method because it does not have the @CONVERSATION annotation. Method 209 is a buffered method as indicated by the use of "@BUFFER" within annotations 204. In one embodiment, the "@OPERATION" annotation causes enhanced compiler 106 to expose (i.e. make publicly accessible) the functionality of the method immediately following the annotation over the network using protocols such as HTTP and SOAP. Similarly, the "@CONVERSATION START", "@CONVERSATION CONTINUE", and "@CONVERSATION FINISH" meta-data annotations indicate to enhanced compiler 106 whether to start a new stateful conversation, continue an existing conversation, or end an existing conversation, respectively.

Although in the illustrated embodiment, each conversational annotation is preceded by an @OPERATION annotation, other embodiments may not require such a construct. For example, the @OPERATION annotation may be inferred from the @CONVERSATION annotation or other characteristics of the source code (e.g., modifiers such as public, private and static). Moreover, the various meta-data annotations described herein represent a subset of meta-data annotations that enhanced compiler 106 is equipped to recognize. Accordingly, the present invention should not be read as being limited to only those meta-data annotations described. Furthermore, it should be noted that any convenient meta-data annotation syntax could be utilized so long as the compiler is equipped to recognize such an extended syntax. In addition, it should be noted that the meta-data need not be communicated to the compiler using source file annotations, but could instead be communicated using e.g. a separate file. For example, the enhanced compiler could be programmed to read meta-data from a specially formatted XML file with the same name as the source file, but with a different file extension without departing from the spirit of the invention.

Declaring Asynchronous Responses

It is not always desirable or possible for web services to return a response to a particular request immediately. Some web services, called asynchronous web services, are designed to return one or more responses temporally separate from the associated original requests.

In one embodiment of the invention, developers may declare asynchronous responses to clients inside an inner interface called Callback. For example,
    public static interface Callback {
      /* @Operation
      * @Conversation Finish */
      void returnResult(String s);
    }

Developers can initiate asynchronous responses using a member variable declared of type Callback as follows:
    Callback client;

When enhanced compiler 106 encounters the Callback interface and associated member variable declaration, it automatically generates code to create a client proxy object that implements the declared Callback interface for returning asynchronous responses and assigns it to the declared member variable. For example, the web service developer could generate the asynchronous response declared above using the following line of code:
    client.returnResult("It worked!");

The client proxy object, including the callback address and a conversation identifier, is stored as part of the conversational state of each web service instance to associate each callback with the appropriate client instance.

Wire Protocols

The annotated source code can further define bindings that specify how the client interface is bound to physical wire formats and protocols. In one embodiment, each service interface can have multiple service bindings for different protocols. In one embodiment, supported service bindings include (but are not limited to) SOAP over HTTP, SOAP over SMTP, generic HTTP Post of XML, transport of XML over other protocols such as FTP and mail, transport of XML over Java Messaging Service (JMS) or Microsoft Message Queuing Services (MSMQ), connection to proprietary protocols and so forth. In one embodiment, information about service interfaces and protocol bindings can be exported via WSDL files.

In one embodiment, the method invoked by web server 102 can be inferred from the data sent over the wire protocol and other meta-data as is illustrated by FIGS. 3A-C. For example, in FIG. 3A, the signature of the 'greeting' method has two parameters, labeled firstname and lastname. Incoming SOAP messages containing an appropriately qualified <greeting> element in the message body and having child elements <firstname> and <lastname> as shown in FIG. 3B should cause this method to be invoked at run time. Enhanced Web Services 104 will parse the request illustrated in FIG. 3B, find the destination object based on the URL /app/mypackage/CreditReport.jws, create String objects based on the <firstname> and <lastname> elements, and pass them as parameters to the "greeting" method based on the <greeting> element. Similarly, Enhanced Web Services 104 will use the return value of the greeting method to generate an HTTP SOAP response such as that illustrated by FIG. 3C.

External Services

As was previously mentioned, in one embodiment, the annotated meta-data of the present invention facilitates access to external services (such as service components 118 and 128) by enhanced web services 104. In one embodiment, enhanced compiler 106 detects one or more annotated member variable declarations representing external services, finds the associated service definition files, automatically generates and assigns proxy objects designed for interacting with the external services, and automatically generates and associates code to handle asynchronous responses from those services. In one embodiment, enhanced compiler 106 scans a provided classpath for one or more service definition files (e.g., WSDL files) matching the classnames of the annotated member variables and automatically generates proxy objects based on the service description. This enables the web service developer to interact with the external web service as if it was a local Java object. For example, the declaration /* @Service */
public Bank mybank;

would allow the developer to use the bank service like this:
float balance=mybank.getBalance( );

In this case, the mybank proxy object generated by enhanced compiler 106 would send a request to the remote Bank service using the address, protocol and format information in the Bank.wsdl file found on the classpath. At run time, the code generated by enhanced compiler 106 will automatically instantiate one proxy object for each of the "@Service" annotations found within the source code as shown above.

Stateful External Services

The service description file associated with an external service may indicate it has stateful conversation methods. In this case, each proxy object generated for interacting with those services will include code to generate and store a unique identifier for the associated conversational instance of the external service. The proxy object will use this unique identifier when generating the conversational message headers stipulated by the external service (see "Conversational Message Headers" below).

Each proxy object, including a unique identifier if present, is stored as part of the state of the service in development. This effectively associates each instance of the service in development with the appropriate instances of external services.

Asynchronous External Services

External services do not always return a response immediately. Accordingly, enhanced compiler 106 automatically generates software for receiving asynchronous responses, associating the responses with the appropriate conversational state, and processing the responses with user defined code.

In accordance with the teachings of the present invention, an asynchronous web service declares its asynchronous responses as "out methods" in it's associated service description (e.g., WSDL) file. Out methods can be viewed as remote callbacks, i.e., remote functions the asynchronous web service invokes to return the result associated with an earlier request back to the caller. Software generated by the enhanced compiler of the present invention will pass these asynchronous responses to specially named member functions as may be defined by the developer. In one embodiment, these member function names are formed by appending the name of the asynchronous out method to the name of its local proxy object. For example, to handle a creditCheckResponse( ) out method of the Bank service defined above, the developer would generate a function of the following form:

public void mybank_creditCheckResponse(String result)
{ . . . }

The external proxy object generated by enhanced compiler 106 will add a reply-address to the associated request and listen at that address for the resulting creditCheckResponse( ) message from the mybank service. In one embodiment, if the asynchronous request is part of a stateful conversation, the proxy object generated by the enhanced compiler will generate and use the appropriate unique identifier to correlate the asynchronous response with the correct conversation state prior to invoking mybank_creditReportResponse( ).

Conversational Message Headers

In one embodiment, the conversational aspect of the present invention is facilitated through the use of message headers that help maintain conversational state throughout the lifetime of the conversation. In one embodiment of the invention, one or more of a conversation ID header, a default callback location header, and an echoed conversation ID are utilized to maintain conversational state. For example, FIG. 4 illustrates a conversation ID header and a callback location header within a SOAP message from the client to the server. The echoed conversation ID is utilized in responses from the server to the client.

In one embodiment, the conversation ID represents a unique string that is generated by the originator of the first message of the conversation. The conversation ID may include any structure so long as it is globally unique. In one embodiment, the client generates a globally unique identifier (GUID), which is then encapsulated in a SOAP header, however, Uniform Resource Locators (URLs), timestamps, and other unique objects can be used to generate a unique identifier in lieu of the GUID. In one embodiment, the client embeds its own instance identifier as part of the conversation ID so asynchronous callbacks from the server that include the conversation ID can be used to route the callback to the appropriate client instance. In addition, if the first message of the conversation returns a synchronous response, the server can generate the GUID and return it to the client as part of the response. When "continue" or "finish" methods are sent as part of a conversation (either from the client to the server or from the server to the client), the same conversation ID that was established in the start message is echoed verbatim. In one embodiment, the callback location represents an arbitrary URL indicating where the client involved in the conversation is listening for callbacks from the web service. In one embodiment, the callback location header can appear in association with any start, continue or finish method.

Compiling Annotated Source Code

Figure 5:
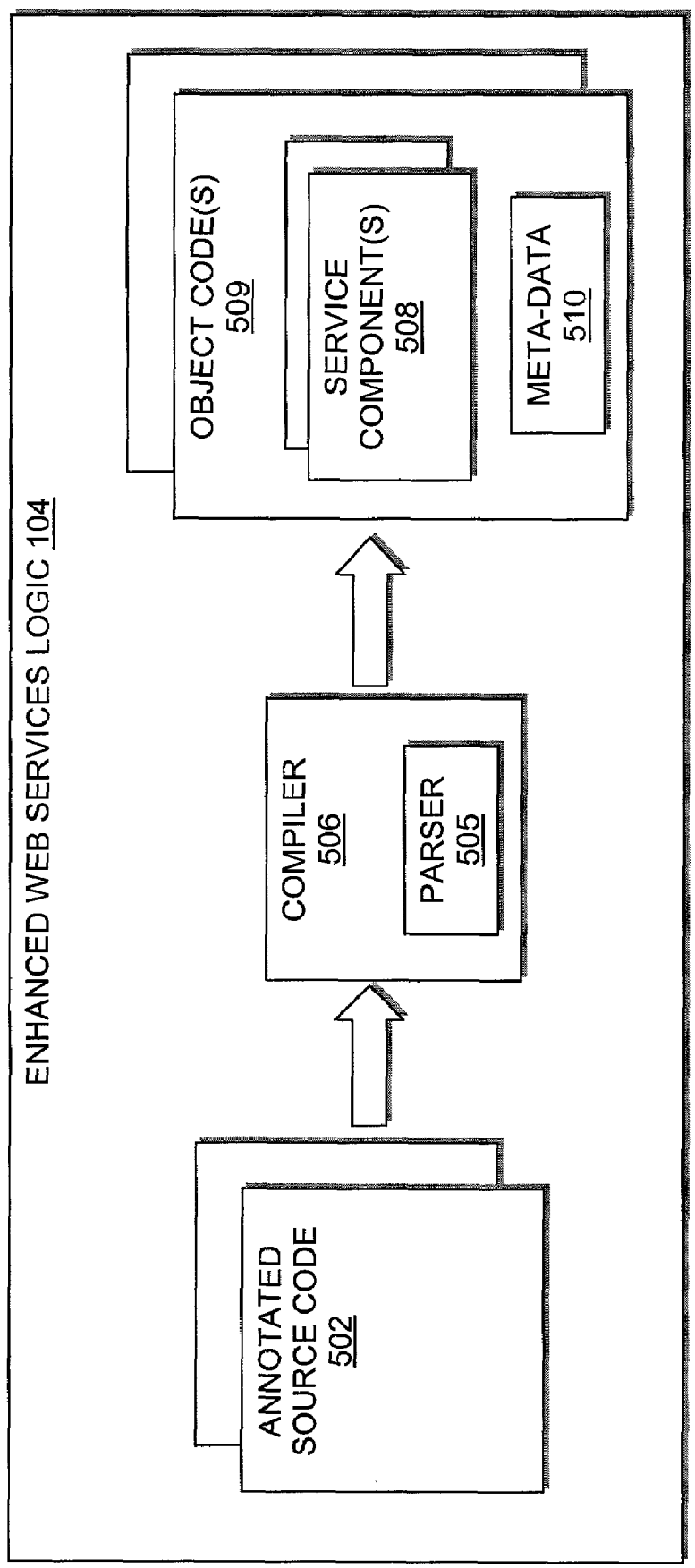
FIG. 5 illustrates one embodiment of enhanced web services of the present invention using a graphical programmatic flow diagram.

FIG. 5 illustrates a graphical programmatic flow diagram of enhanced web services 104, in accordance with one embodiment of the invention. In the illustrated embodiment, one or more annotated source code files 502 are provided to enhanced compiler 506 to be compiled into one or more object code files 509, defining one or more executable service components accessible by remotely connected clients. In one embodiment, annotated source code files 502 represent one or more Java-based files that have been augmented with meta-data annotations in accordance with one embodiment of the invention to facilitate simplified web service development and deployment. Although in the illustrated embodiments, annotated source code files 502 are described as being Java based, they can nonetheless represent a variety of programming languages known in the art, such as C++ and ECMAScript.

Once compiler 506 receives annotated source code files 502, parser 505 reads and parses programming statements contained within the source code. In one embodiment, compiler 506 is enhanced to recognize annotations based on an extended syntax for specifying functionality of the source file to be deployed as a web service. Accordingly, as parser 505 parses the annotated source code, it identifies the presence and composition of embedded annotations based on this extended syntax. In one embodiment of the present invention, compiler 506 infers by way of the source code annotations the interface of the web service that is to be exposed to remote clients, the interface of services that will be called by the runtime to be created by compiler 506, as well as internal storage requirements and persistence behavior of the web service.

During the parsing of annotated source code 502, parser 505 identifies the object types used in the code and attempts to locate definitions corresponding to each type. For example, if a variable "b" of type "Bank" is declared, parser 505 determines whether an object or library file defining the "Bank" type already exists within a given set of directories (e.g., as created by IDE 111 on web server 102). If an object or library file does not exist, parser 505 determines whether a source file exists that could be run through compiler 506 to generate an object file. Similarly, if neither an object file, library file, nor a source file exists, parser 505 determines whether a web service description (e.g., WSDL) file exists that could be used by compiler 506 to generate an object file implementing a proxy object for interacting with the associated web service. In accordance with one embodiment of the invention, if an object file is determined not to exist, parser 505 walks through an ordered list of file types so as to identify a file that could be used in generating the requisite object file.

In one embodiment, compiler 506 generates one or more object files defining publicly accessible service components 508 that may be executed by one or more remote clients. In addition, compiler 506 generates meta-data 510 based on annotated source code 502 and associates it with object codes 509 and service components 508. In one embodiment, meta-data 510 includes descriptions of the annotations, methods, member variables, external services and callback interfaces associated with the service. Once compiler 506 has compiled annotated source code 502 into executable code, the code is then provided to an execution engine (not shown) that controls the execution of the code (by e.g. a processor), and performs conventional execution runtime services, such as memory allocation request and release, error/exception handling, and so forth. For the illustrated embodiment, compiler 506 includes an application programming interface (API) (not shown), through which programming statements contained within annotated source code 502 may be programmatically submitted for compilation by a variety of application-specific processes. For example, in accordance with one embodiment of the present invention, web server 102 makes calls to enhanced web services 104 upon receiving SOAP encapsulated XML method invocations via networking fabric 100.

Figure 6:
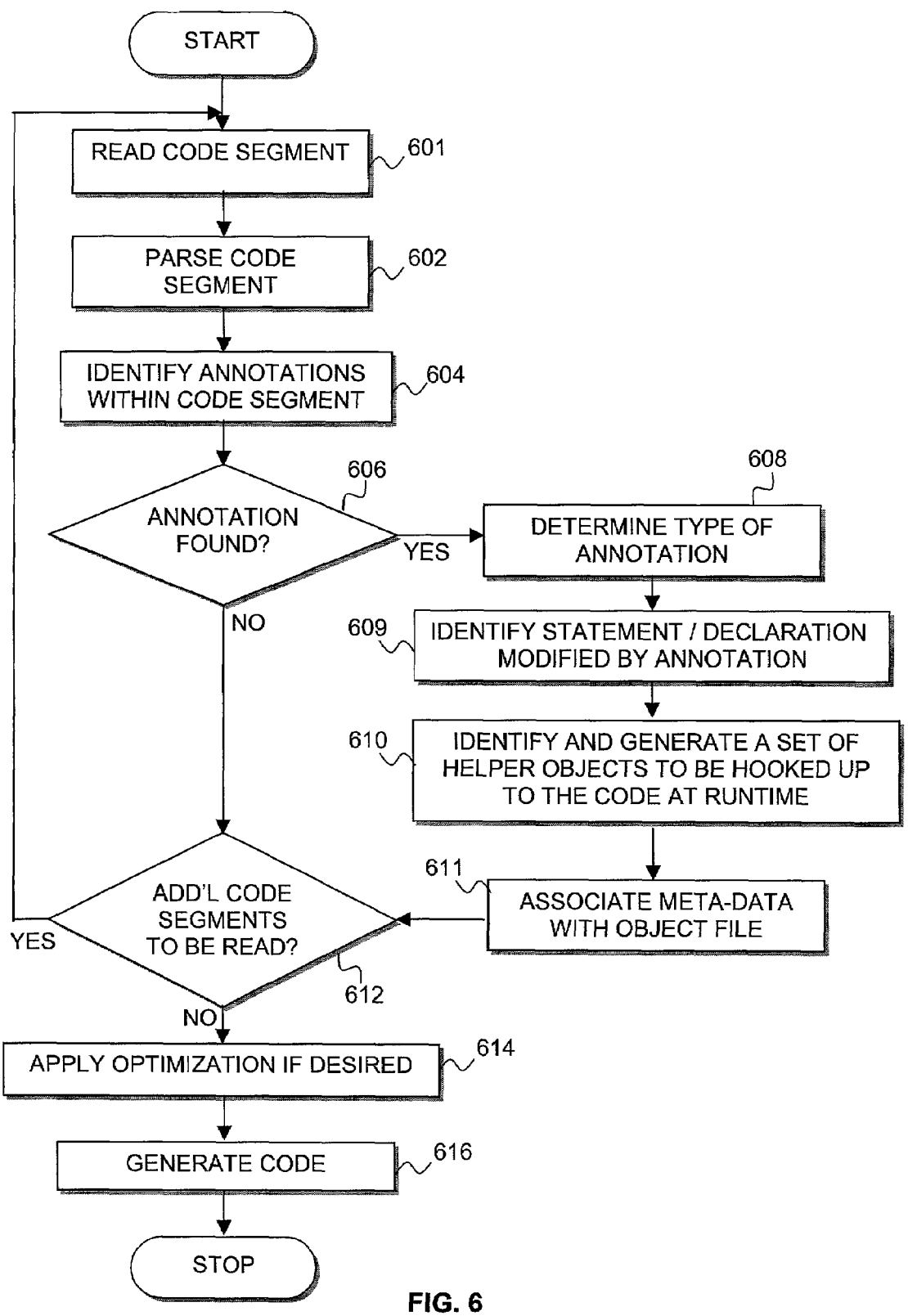
FIG. 6 illustrates an example compiler operational flow in accordance with one embodiment of the invention.

FIG. 6 illustrates an example operational flow of compiler 506 in accordance with one embodiment of the invention. In operation, compiler 506 first reads a segment of code from annotated source code 502, block 601. Using any one of a number of parsing techniques known in the art, parser 505 then parses the code segment read to identify one or more annotations contained therein based upon a language dictionary or grammar maintained by compiler 506 (blocks 602 & 604). If an annotation is found, compiler 506 determines the annotation type (e.g. conversational, asynchronous, and so forth), block 608, identifies the statement or declaration it modifies, block 609, identifies and generates a set of helper objects to be hooked up to the object file being compiled at runtime, block 610, and associates meta-data extracted from the annotations with the object file, block 611. If an annotation is not found within the code segment, or after the helper objects have been generated as the case may be, compiler 506 continues to read code segments and evaluate expressions until all code have been read and parsed, block 612. Moreover, compiler 506 may optionally apply one or more optimizations to the expressions analyzed, block 614. The optimizations may be any one or more of the applicable compiler optimization techniques known in the art. Finally, with or without optimizing the commands analyzed, at block 616, compiler 506 generates executable code for the expressions analyzed. In one embodiment, compiler 506 generates byte codes for the expressions analyzed. In alternate embodiments, other equivalent "code generation" approaches may be practiced instead.

Illustrative Web Service Definition

Figure 7:
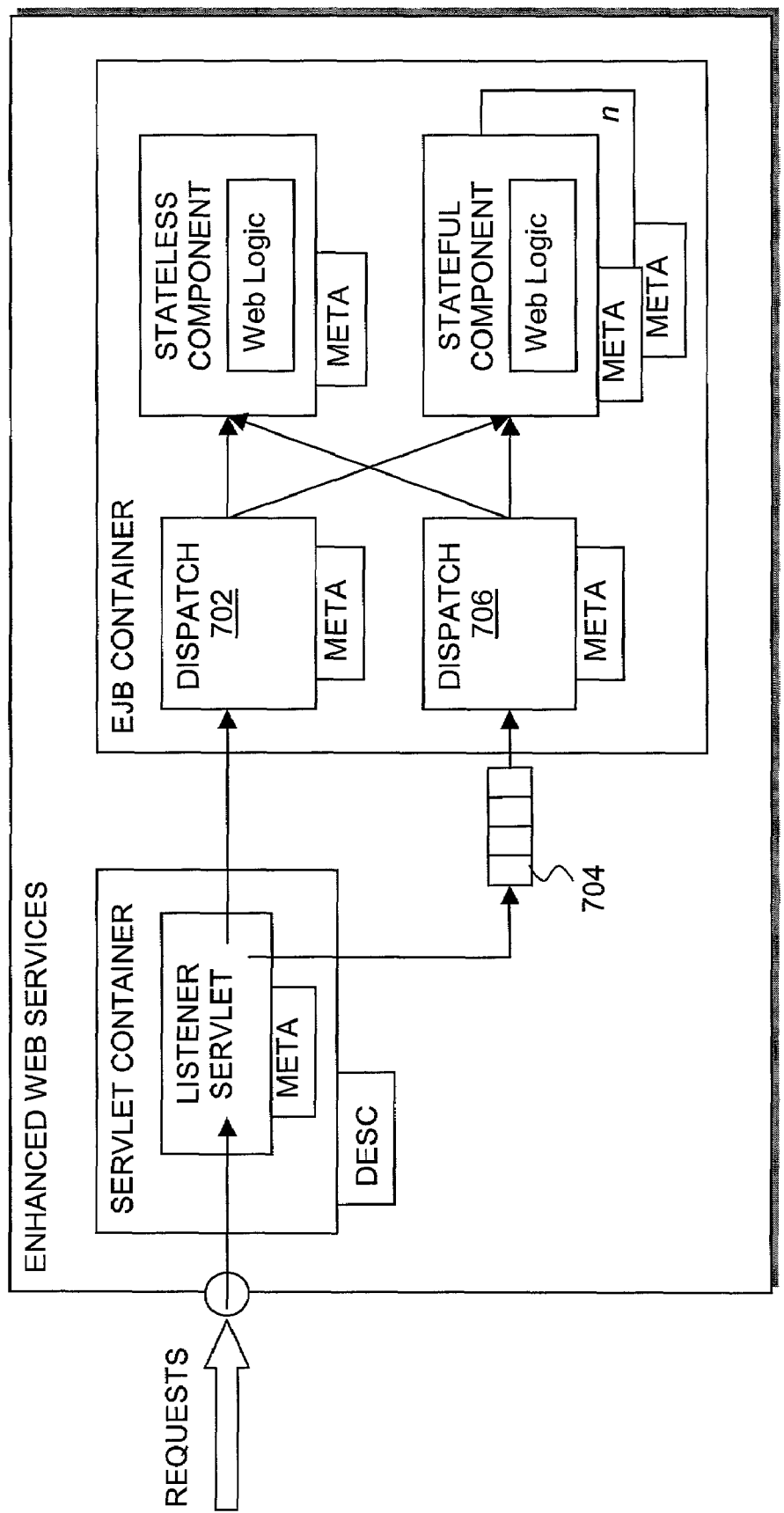
FIG. 7 illustrates a conceptual web service definition resulting from the compilation of one or more annotated source code files in accordance with one embodiment of the invention.

Compilation of the annotated source code by enhanced compiler 106 causes one or more object files, software components, and deployment descriptors to be generated so as to facilitate the automated deployment of the web services. FIG. 7 illustrates a conceptual web service definition resulting from the compilation of one or more annotated source code files in accordance with one embodiment of the invention.

The web service definition of FIG. 7 includes a servlet container and an Enterprise JavaBean (EJB) container. The servlet and EJB containers are communicatively coupled together for the dispatch of web service requests. In the illustrated embodiment, the servlet container listens for requests received on a designated communication port, and uses deployment descriptors (DESC) to identify which servlet should respond to the request. In one embodiment, all requests for files with a ".jws" extension are routed to the listener servlet. In one embodiment, the listener servlet uses the URL of the request to determine which web service should receive the request and identify the location of associated meta-data (META) 510 (e.g., stored in the class file) previously generated by enhanced compiler 506.

In one embodiment of the invention, when the enhanced compiler compiles the annotated source code files, it builds and deploys one or more EJBs depending upon the constitution of the code. At a minimum, the enhanced compiler builds and deploys at least one dispatch component (702) to service messages forwarded from the servlet container. If the enhanced compiler identifies that the web service has at least one buffered method, the enhanced compiler generates a queue structure (704) in addition to deploying a message driven bean to service the queue. Similarly, if the particular web service contains stateless methods the enhanced compiler deploys a stateless session bean to handle requests for those methods. In addition, if the web service contains stateful methods, the enhanced compiler will deploy an entity bean to manage conversational state associated with each service instance. Dispatch components 702 and 706 use meta-data (META) 510 generated by enhanced compiler 506 to determine whether the requested method is stateful or stateless and deploy it to a stateful or stateless component as appropriate. If the requested method is stateful, dispatch components 702 and 706 further use meta-data (META) 510 to determine whether the method is a start method, continue method or finish method, and creates a new stateful instance or looks up a previously created instance as appropriate (see discussion of FIG. 9 below).

Illustrative Runtime Operation

Figure 8:
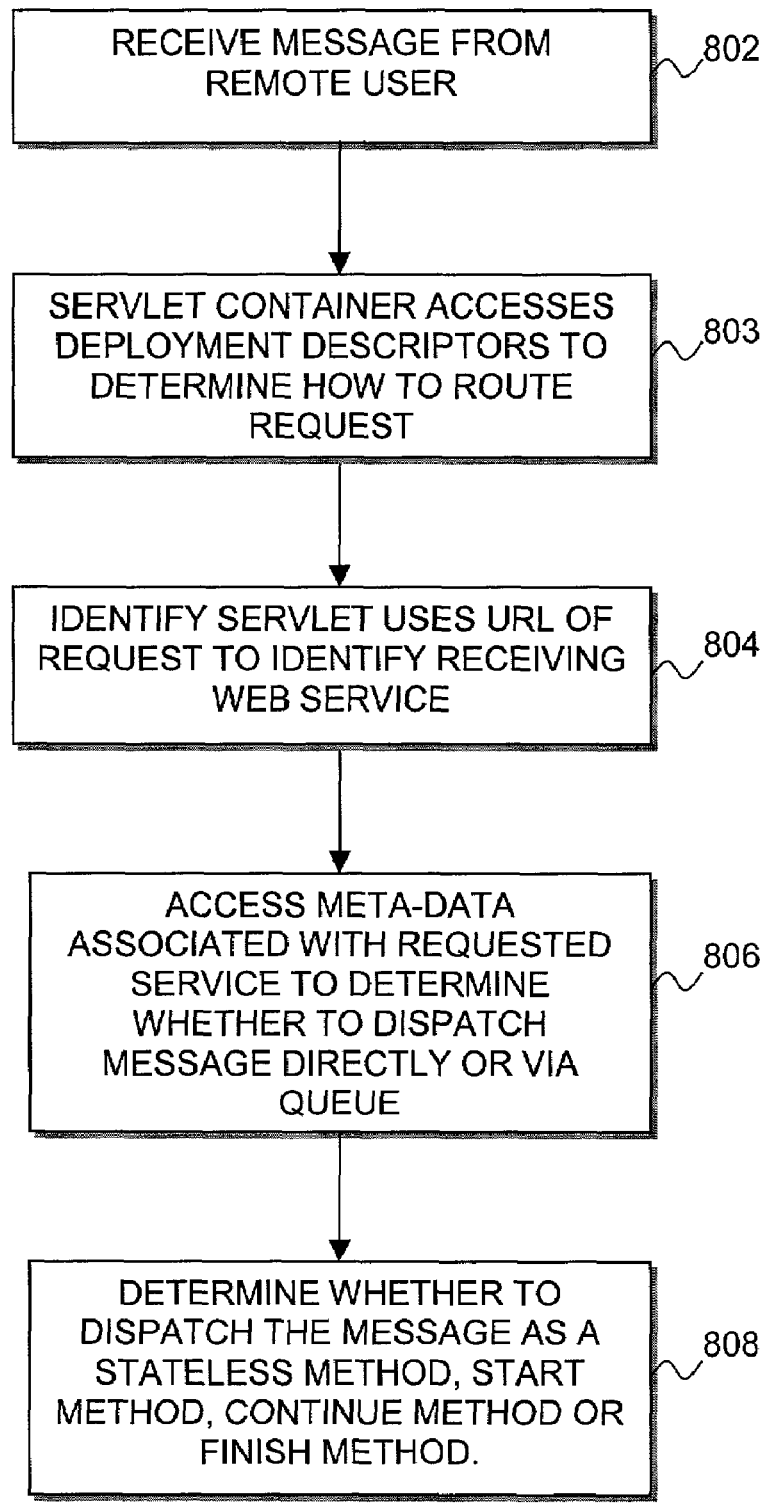
FIG. 8 illustrates one embodiment of a runtime operational flow of the enhanced web service definition of FIG. 7.

FIG. 8 illustrates one embodiment of a runtime operational flow of the enhanced web service definition of FIG. 7. To begin, web services 104 receive a message over networking fabric 100 from a remote device such as user client 112 (802). In one embodiment, the message is a SOAP encapsulated web service request transmitted via HTTP. Once the message is received, the servlet container extracts the SOAP request from the HTTP message and utilizes associated deployment descriptors to determine how to direct the request (803). For example, the deployment descriptors may state that all requests identifying a web service having a predetermined filename extension such as "*.jws" are to be routed to the listener servlet for further dispatch. In one embodiment, the listener servlet then uses the request URL to identify the receiving web service (804) and accesses the associated meta-data 510 generated earlier by enhanced compiler 506 to determine whether to dispatch the message directly or via a queue (806). One of dispatchers 702 and 706 further access meta-data 510 to determine whether to dispatch the message as a stateless method, start method, continue method or finish method (808).

Figure 9:
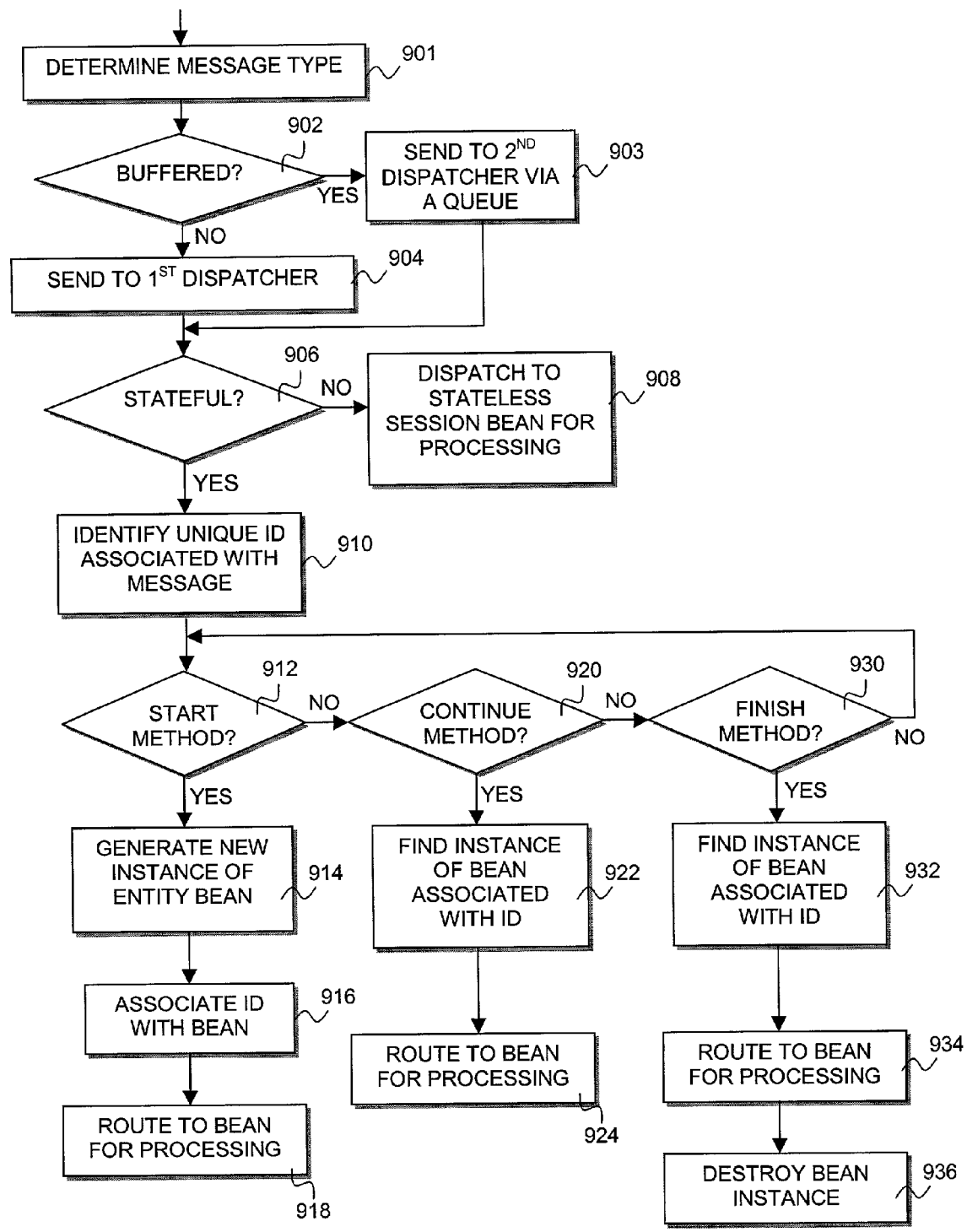
FIG. 9 illustrates one embodiment of the message dispatch process of the enhanced web service definition of FIG. 7.

FIG. 9 illustrates one embodiment of the message dispatch process of the enhanced web service definition of FIG. 7. To begin, the listener servlet determines the method to invoke by e.g. parsing the SOAP message (901). In one embodiment, the listener servlet utilizes the meta-data associated with the method to identify whether the message identifies a buffered or non-buffered method (902). If the listener servlet determines that the message does not identify a buffered method, the listener servlet routes the message to a generic dispatcher 702 (904). If, however, the listener servlet determines that the message identifies a buffered method (902), the listener servlet routes the message to dispatcher 706 by way of queue 704 (903). Next, the selected dispatcher examines the associated meta-data to determine whether the message identifies a stateful or stateless method (906). If a stateless message is identified, the dispatcher routes the message to a stateless session bean for processing by the web services logic wrapped by the bean (908). If, however, the selected dispatcher determines that the message identifies a stateful method, the dispatcher identifies a unique identifier associated with the message (910). In one embodiment, the unique id is generated by the requesting client device and is encapsulated within one or more SOAP message headers.

The dispatcher then continues to determine whether the message represents a start method (912) a continue method (920) or a finish method (930). If the method represents a start method (912), a new instance of an entity bean containing the web service logic and conversational state is generated (914), and then associated with the identifier (916). The dispatcher uses the associated meta-data to determine if annotated source code 107 defined a Callback interface and declared a variable of type Callback. If so, a client proxy object for interacting asynchronously with the client is created based on the Callback interface and is assigned to the declared variable. Further, the dispatcher determines whether annotated source code 107 declared one or more variables for interacting with external services. If so, the dispatcher creates proxy objects for interacting with these remote services based on the interfaces defined by the associated service definition (e.g., WSDL) files, and assigns them to the declared variables. Further, the dispatcher configures the web service to accept all asynchronous callbacks declared in each of the associated service definition (e.g., WSDL) files and route the callbacks to web service methods named by appending the declared variable name to the callback method name (e.g., mybank_creditCheckResponse (String result)). The dispatcher stores all proxy objects (whether created for interacting with the client or other external services) as part of the conversation state of the entity bean. The message is then routed to the new entity bean instance for further processing by the web logic.

If the method represents a continue method (920) or finish method (930), the bean instance associated with that identifier is found (922, 932), and the message is routed to that bean for further processing by the web logic (924,934). With the finish method however, the bean instance is destroyed once the processing has completed (936).

In one embodiment of the invention, once the message has been routed to a bean (whether stateful or stateless), a SOAP handler removes the encapsulated XML message from the SOAP body, determines which method of the web service logic to invoke based on the root element of the XML message, maps XML child elements onto newly created programming language objects to be used as arguments to the method, and invokes the web service method passing the newly created objects as parameters. If the invoked web service method returns a value synchronously, the bean will map the value onto a corresponding XML element, package it in a message and return it to the client using the same protocol details used in the request (e.g., SOAP over HTTP).

Once invoked, any web service method can use the proxy objects created for generating calls to the client or external services. The proxy objects will map objects passed as parameters into corresponding XML elements and use them and the remote method name to generate and send a message to the remote service or client. In the case of external services, the message is generated and sent using the protocol specifics (e.g., SOAP over HTTP) specified by the associated service description file. In the case of the client, the message is generated and sent using the protocol specifics used by the client in the initial start method. In one embodiment, synchronous responses from the client or remote services are parsed to extract the result and map it onto a representative object, which is returned to the web service code as the return value of the proxy object method invocation.

Asynchronous responses and requests from external services are dispatched to the appropriate entity bean by the listener servlet and dispatch beans just like requests sent by the client. These responses are routed to the appropriate method of the web service logic identified by a special naming convention. Specifically, they are routed to methods named by appending the name of the external service out method to the declared service proxy variable name (e.g., mybank_creditCheckResponse(String result)).

Example Host Computer System

Figure 10:
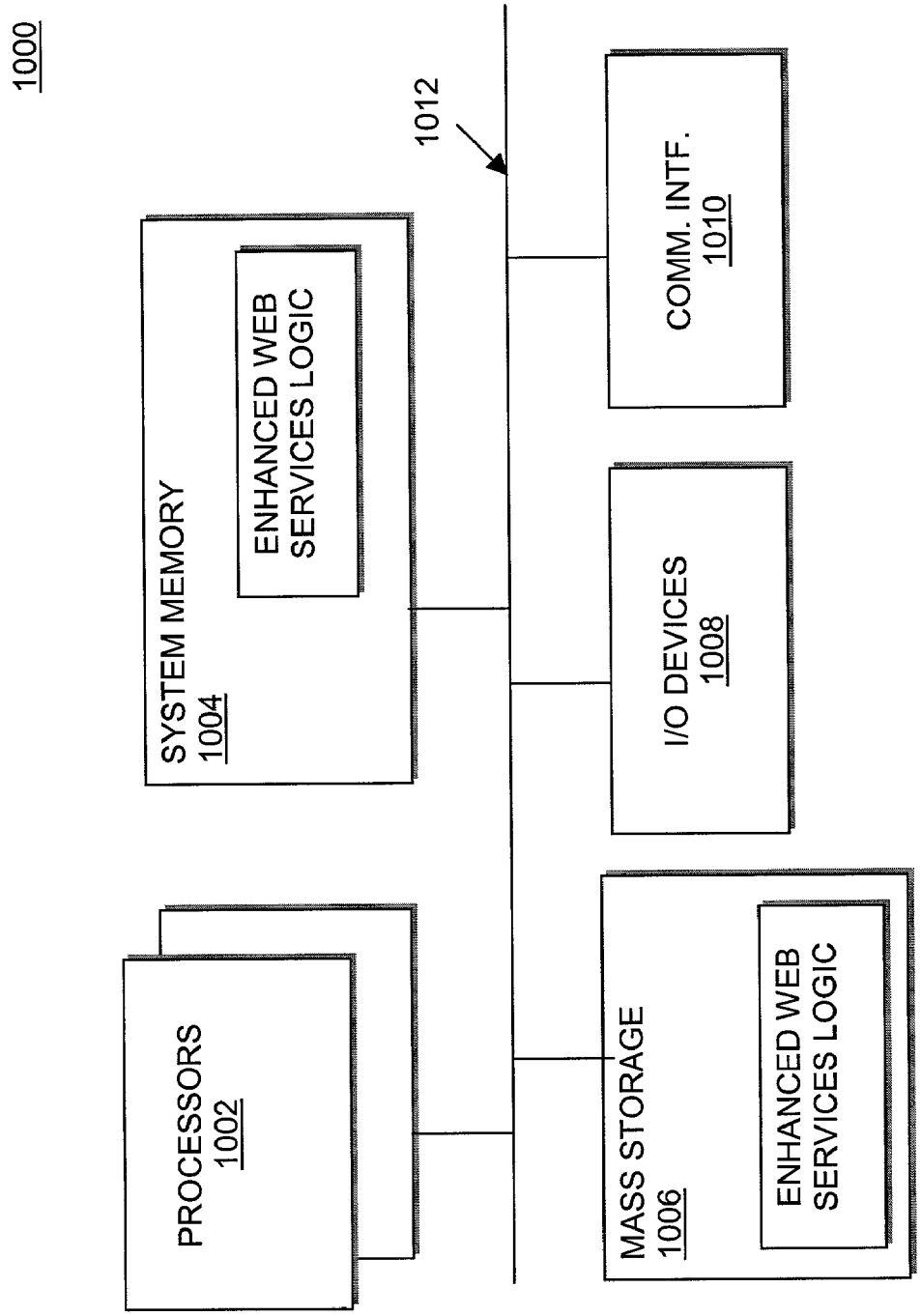
FIG. 10 illustrates an example computer system suitable for hosting web services development platform of the present invention.

FIG. 10 illustrates an example computer system suitable for hosting web services development platform of the present invention. As shown, computer system 1000 includes one or more processors 1002, and system memory 1004. Additionally, computer system 1000 includes mass storage devices 1006 (such as diskette, hard drive, CDROM and so forth), input/output devices 1008 (such as keyboard, cursor control and so forth) and communication interfaces 1010 (such as network interface cards, modems and so forth). The elements are coupled to each other via system bus 1012, which represents one or more buses. In the case of multiple buses, they are bridged by one or more bus bridges (not shown). Each of these elements performs its conventional functions known in the art. In particular, system memory 1004 and mass storage 1006 are employed to store a working copy and a permanent copy of the programming instructions implementing the compiler and/or enhanced web services of the present invention. The permanent copy of the programming instructions may be loaded into mass storage 1006 in the factory, or in the field, through e.g. a distribution medium (not shown) or through communication interface 1010 (from a distribution server (not shown). The constitution of these elements 1002-1012 are known, and accordingly will not be further described

Conclusion and Epilogue

Thus, it can be seen from the above description, an annotation based development platform for stateful Web services has been described. While the present invention has been described referencing the illustrated and above enumerated embodiments, the present invention is not limited to these described embodiments. Numerous modification and alterations may be made, consistent with the scope of the present invention as set forth in the claims to follow. Thus, the above-described embodiments are merely illustrative, and not restrictive on the present invention.

What is claimed is:

1. In a server having an asynchronous web service, a method comprising:
   receiving by the server a message from a client remotely disposed from the server requesting that the web service be invoked;
   parsing by the server the message to identify the requested web service method in addition to a callback address indicating a location where the client is listening for callbacks from the web service;
   storing by the server the callback address in association with a proxy object; and
   invoking by the server the requested web service method, including passing programming language objects as parameters to the web service method, the programming language objects having been mapped from data representation language elements of the message.

2. The method of claim 1, further comprising:
   identifying an instance identifier provided by the client indicating a particular instance of the client that is listening for callbacks from the web service; and
   storing the instance identifier in association with the callback address and the proxy object.

3. The method of claim 2, wherein at least one of the callback address and the instance identifier is encapsulated in one or more request messages.

4. The method of claim 3, wherein at least one of the callback address and the instance identifier is encapsulated in one or more SOAP message headers.

5. The method of claim 2, wherein the instance identifier is embedded within a conversation identifier used to access a corresponding instance of a conversation between the client and the web service.

6. The method of claim 2, wherein the instance identifier is a GUID.

7. The method of claim 2, further comprising:
   generating an asynchronous response to the client in response to the message by invoking a method on the proxy object using a declared member variable, wherein invoking includes passing programming language objects as parameters to said method,
      mapping the programming language objects and method invocation onto representative data representation language elements;
      packaging the representative data representation language elements, and callback instance identifier into an asynchronous response message; and
      transmitting the asynchronous response message to the client at the callback address in accordance with one or more protocols used by the client in transmitting the original request message to the web service.

8. The method of claim 1, wherein invoking the requested web service method further comprises:
   mapping programming language objects returned by the web service method onto representative data representation language elements;
   packaging the representative data representation language elements according to one or more protocols used by the client in generating the requested message; and
   transmitting the packaged data representation elements to the client in accordance with one or more protocols used by the client in transmitting the message to the web service.

9. An article of manufacture comprising:
   a storage medium having stored therein a plurality of programming instructions designed to program a server to implement an asynchronous web service, which programming instructions when executed enable the server to
      receive a message from a client requesting that a web service method be invoked;
      parse the message to identify the requested web service method in addition to a callback address indicating a location where the client is listening for callbacks from the web service;
      store the callback address in association with a proxy object; and
      invoke the requested web service method, including passing programming language objects as parameters to the web service method, the programming language objects having been mapped from data representation language elements of the message.

10. The article of claim 9, wherein the programming instructions further enable the server to
    identify an instance identifier provided by the client indicating a particular instance of the client that is listening for callbacks from the web service; and
    store the instance identifier in association with the callback address and the proxy object.

11. The article of claim 10, wherein at least one of the callback address and the instance identifier is encapsulated in one or more request messages.

12. The article of claim 11, wherein at least one of the callback address and the instance identifier is encapsulated in one or more SOAP message headers.

13. The article of claim 10, wherein the instance identifier is embedded within a conversation identifier used to access a corresponding instance of a conversation between the client and the web service.

14. The article of claim 10, wherein the instance identifier is a GUID.

15. The article of claim 10, wherein the programming instructions further enable the server to generate an asynchronous response to the client in response to the message by invoking a method on the proxy object using a declared member variable, wherein invoking includes passing programming language objects as parameters to said method, mapping the programming language objects and method invocation onto representative data representation language elements;

packaging the representative data representation language elements, and callback instance identifier into an asynchronous response message, and transmitting the asynchronous response message to the client at the callback address in accordance with one or more protocols used by the client in transmitting the original request message to the web service.

16. The article of claim 9, wherein the programming instructions to cause the server to invoke the requested web service further cause the server to map programming language objects returned by the web service method onto representative data representation language elements;

package the representative data representation language elements according to one or more protocols used by the client in generating the requested message; and transmit the packaged data representation elements to the client in accordance with one or more protocols used by the client in transmitting the message to the web service.

* * * * *

UNITED STATES PATENT AND TRADEMARK OFFICE
CERTIFICATE OF CORRECTION

| | | |
|---|---|---|
| PATENT NO. | : 7,356,803 B2 | Page 1 of 1 |
| APPLICATION NO. | : 10/082807 | |
| DATED | : April 8, 2008 | |
| INVENTOR(S) | : Bau, III et al. | |

It is certified that error appears in the above-identified patent and that said Letters Patent is hereby corrected as shown below:

In column 1, line 25, delete "extensible" and insert -- eXtensible --, therefor.

In column 3, line 65, delete "collected" and insert -- collocated --, therefor.

Signed and Sealed this

Ninth Day of February, 2010

David J. Kappos
*Director of the United States Patent and Trademark Office*